US009210016B2

(12) United States Patent
Wang et al.

(10) Patent No.: US 9,210,016 B2
(45) Date of Patent: Dec. 8, 2015

(54) ACTIVE SENSING METHOD BASED ON SPECTRAL CORRELATION FOR COGNITIVE RADIO SYSTEMS

(71) Applicant: National Tsing Hua University, Hsinchu (TW)

(72) Inventors: Chin-Liang Wang, Hsinchu (TW); Han-Wei Chen, Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 453 days.

(21) Appl. No.: 13/665,009

(22) Filed: Oct. 31, 2012

(65) Prior Publication Data

US 2014/0064114 A1    Mar. 6, 2014

(30) Foreign Application Priority Data

Aug. 30, 2012   (TW) ................................. 101131648

(51) Int. Cl.
*H04L 27/00* (2006.01)
*H04L 5/00* (2006.01)

(52) U.S. Cl.
CPC .......... *H04L 27/0006* (2013.01); *H04L 5/0048* (2013.01)

(58) Field of Classification Search
None
See application file for complete search history.

(56) References Cited

U.S. PATENT DOCUMENTS

| 8,824,527 | B2* | 9/2014 | Thompson et al. | ............ 375/148 |
| 2009/0190537 | A1* | 7/2009 | Hwang et al. | ................. 370/329 |
| 2010/0172427 | A1* | 7/2010 | Kleider et al. | ................. 375/260 |
| 2011/0085612 | A1* | 4/2011 | Muraoka et al. | ............. 375/260 |
| 2011/0167321 | A1* | 7/2011 | Hwang et al. | ................. 714/786 |

* cited by examiner

*Primary Examiner* — Robert C Scheibel
(74) *Attorney, Agent, or Firm* — Jackson IPG PLLC; Demian K. Jackson

(57) ABSTRACT

A design of cognitive radio (CR) signal structure which based on the spectral correlation can be used for active sensing. In this signal structure, the known pilots used for the primary users (PUs) are duplicated and reallocated in the CR transmission signal properly. With this CR signal structure, the received signal of spectrum sensors will become correlated on the subcarriers when PU reoccupation occurs while the CR transmission is active, and thus PU activities can easily be detected by computing the spectral correlation function. As compare with the traditional cyclostationary feature detection scheme, this method can enhance the active sensing performance while remaining the service quality of the CR system, achieving better detection performance in the same detection time, reducing sensing time (about $\frac{1}{10}$ of the traditional sensing time), and still reaching the satisfactory outcome even in the circumstances of low SNR and SINR.

7 Claims, 3 Drawing Sheets

ACTIVE SENSING METHOD BASED ON SPECTRAL CORRELATION FOR COGNITIVE RADIO SYSTEMS

This application claims the priority benefits of Taiwanese Application 101131648 filed Aug. 30, 2012.

BACKGROUND OF THE INVENTION

1. Field of the Invention

The present invention relates to an active spectrum sensing method of cognitive radio (CR) systems based on spectral correlation function (SCF). In this invention, the known pilots used for the primary users (PUs) are duplicated and reallocated in the subcarriers of CR signals. With this CR signal structure, the received signal of spectrum sensors will become correlated on the subcarriers when PU reoccupation occurs while the CR transmission is active, and thus PU activities can easily be detected by computing the spectral correlation function of the received signal.

2. Description of Related Art

In recent years, the wireless mobile communication technology provides users with a good spatial and temporal flexibility. However, the complexity of the wireless mobile channel characteristics, the limited radio spectrum resources, and emerging new businesses have been calling higher demands to wireless transmission technology for the flourishing development of wireless services.

With the rapid development of wireless communication technology, the spectrum scarcity problem has been gradually highlighted. The wireless spectrum resource has become one of the very precious resources. One survey of the U.S. Federal Communications Commission (FCC) shows that utilization of licensed spectrum in time and space is very low. For example, certain frequency bands have been allocated to a certain industry, but that industry does not use the entire bands. This example means that a considerable part of licensed bands is not utilized efficiently. The current utilization of the majority of the licensed spectrums is about 15% to 85%. Therefore, the FCC believes that the existing major problem is the static spectrum allocation of spectrum resources has not been fully utilized, instead of no spectrum is available.

The concept of CR was first proposed by Mitola in 1999. By cognizing environments, the CR system has the ability to improve the spectrum utilization by allocating unauthorized users (i.e., CR users) to the spectrum while the spectrum is idle at a specific time and in a specific space. This dynamic spectrum sharing can greatly increase the efficiency of spectrum utilization.

Spectrum detection system is essential to the CR technologies. The users of CR systems must monitor the spectrum changes in real-time so as to avoid any collision with an authorized user. Spectrum detection accuracy and reliability determine whether the normal communication for the authorized user can be assured. Currently available spectrum detection methods include matched filter detection, cyclostationary feature detection, and energy detection, etc. The matched filter detection needs to know the priori information of authorized user signals, such as modulation types, pulse shapings, and packet formats. The cyclostationary feature detection uses the spectral characteristics of the signals for detection, which has better detection performance at a low signal to noise ratio but with larger computational complexity. The energy detection is a traditional detection method; the greatest advantage of the energy detection is that the detector just needs to know the energy level of a signal in the frequency band to be detected without other a priori information of that signal. Therefore, the energy detection can be applied to the cognitive radio for a pre-crude detection to improve detection efficiency. However, the threshold of the energy detection is hard to set so that when the noise is uncertain it greatly influences the detection performance. Furthermore, the traditional energy detection only relies on the amount of energy as the base of judgment, which cannot distinguish between useful signals and interferences and noises, not mention to distinguish between the types of the received signals and modulation. The above defects will undoubtedly limit the use of energy detection in some circumstances.

The spectrum sensing technology is one of the key technologies for the cognitive radio systems. Periodic spectrum sensing architecture can provide reliable sensing sensitivity. Through introducing a quiet period between sensing signal frames, the primary users (PUs) can be protected from interfering. However, too many intra-frame quiet periods for the cognitive radio signals might deteriorate the quality of service (QoS) for the cognitive radio network. To solve this problem, it has been suggested that the intra-frame quiet sensing periods can be replaced by performing active spectrum sensing and data transmission simultaneously. A cyclostationary feature detector which is robust to noise can be used for active sensing. Detecting the features of pilot signals in the primary user signals effectively improves the detection sensitivity in the active detection. Due to the interference from the transmission of the cognitive radio network, the active detection has shortcomings such as finite sensing performance. That would be unchanged for the fact that the same spectrum interference causes the decrease in detection performance, even used in combination with the cyclostationary feature detection. Therefore, there is still a need of a novel method which can meet the user's need in practical use.

SUMMARY OF THE INVENTION

A main purpose of this invention is to overcomes the shortages in the prior art and therefore to provide an active spectrum sensing method which bases on the cyclostationary signature principle and includes coping data of pilot signals of primary user signals to a cognitive radio network system to form a mixed signal; and then obtaining a spectral correlation of the intensity characteristics for the mixed signal from a spectral correlation function of an active detection node.

Another purpose of this invention is to provide an active spectrum sensing method which can enhance the performance of the active sensing performance while maintaining the service quality of the cognitive radio system, and achieve better detection performance in the same detection time Another purpose of this invention is to provide an active spectrum sensing method which can enhance the performance of the active sensing performance, reduce sensing time (about $\frac{1}{10}$ of the traditional sensing time), and still reaching the satisfactory outcome even in the circumstances of low SNR and SINR. Furthermore, this invention can detect any time while transmit data with high channel specification.

Still another purpose of this invention is to provide an active spectrum sensing method which can detect any time while transmit data with high channel specification, reaches the effect that even in the suburbs the digital TV can be received as well and therefore can be widely applied to the systems regarding to the cognitive radio system and the relevant users.

In order to achieve the above and other objectives, an active spectrum sensing method using a cognitive radio structure based on spectrum correlation at least includes the following steps: (A) coping data of pilot signals from signals of primary users (PUs) (referred to as primary user signal here below), and embedding the pilot signals to subcarriers in one or more cognitive radio (CR) network systems to form a mixed signal; (B) when both of the primary user network system and the cognitive radio network system are to transmit, a spectral correlation of the intensity characteristics for the mixed signal is obtained from a spectral correlation function (SCF) of an active detection node; and (C) detecting the spectral correlation of the intensity characteristics by an energy detection method.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
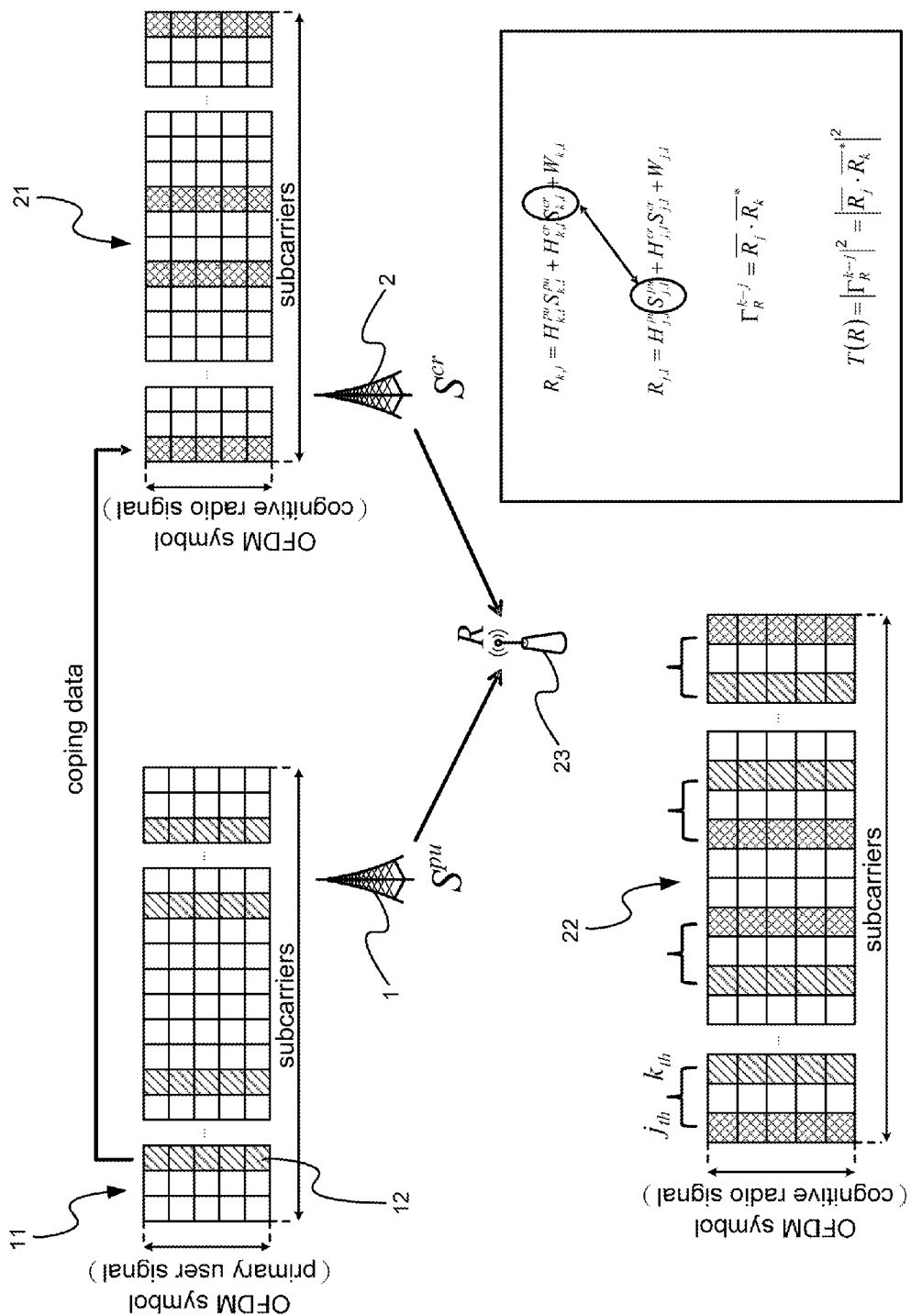
FIG. 1 is a schematic view of an active spectrum sensing structure according to one embodiment of the invention.

FIG. 1 is a schematic view of an active spectrum sensing structure according to one embodiment of the invention. As shown, an active spectrum sensing method using a cognitive radio structure based on spectrum correlation according to the invention at least includes the following steps:

(A) copying pilot signals 12 of primary users (PUs) 1 at sub-carriers 11, and embedding the pilot signals 12 to sub-carriers 21 in one or more subcarriers of cognitive radio (CR) systems 2. A mixed signal 22 is formed when both CR and PU are transmitting data.

(B) obtaining a spectral correlation of the intensity characteristics for the mixed signal 22 from a spectral correlation function (SCF) of an active detection node 23 of the cognitive radio network system when both of the primary user system 1 and the cognitive radio system 2 are transmitting; and (C) detecting the spectral correlation of the intensity characteristics by energy detection (ED) method.

At the above step (A), the pilot signals pass through the cognitive radio system, and generated by data deploying on two or more subcarrier of CR signals.

In one preferred embodiment in which considering the active spectrum sensing in the presence of PUs, both of the primary user network system and the cognitive radio network system transmit in the same frequency band, and the active sensing nodes in the cognitive radio network system receives the primary user signals and the cognitive wireless signals consist of the mixed signal. Assume that the primary user network system is a pilot embedded system, such as orthogonal frequency division multiplexing (OFDM) based system, the pilot signals can acknowledge from the active sensing node in the OFDM-based cognitive wireless network system. Then, the transmitter in the cognitive radio network system serves as one of the subcarrier having the same pilot value for the primary user signals or having outer signals embedded into its signals. When both the primary user network system and the cognitive radio network system are to transmit, the intensity characteristics of the mixed-signal can easily seek out through the spectral correlation function of the active sensing node.

The data deployment in this method duplicates the pilot value or the primary user signal, and embeds the pilot signal or value into one or more the subcarriers of cognitive wireless signal frequency. As shown in FIG. 1, the horizontal axis and vertical axis respectively represent the sub-carrier and OFDM symbol of the primary user signal and the cognitive radio signal in the spectrum domain. In the primary user signal, the subcarrier with a slash direction is the pilot signal. The pilot signal $S_{j,l}^{pu}$ of primary user's $j_{th}$ subcarrier is duplicated, and the primary users (PUs) of the cognitive radio network system embed the pilot signal $S_{j,l}^{pu}$ into the $k_{th}$ subcarrier of its own signal. Therefore the signal received by the active sensing node in the cognitive radio network system is as follows:

$$R_{j,l}=H_{j,l}^{pu}\cdot S_{j,l}^{pu}+H_{j,l}^{cr}\cdot S_{j,l}^{cr}+W_{j,l}$$

$$R_{k,l}=H_{k,l}^{pu}\cdot S_{k,l}^{pu}+H_{k,l}^{cr}\cdot S_{k,l}^{cr}+W_{k,l}$$

Wherein $R_{j,l}$ and $R_{k,l}$ respectively represent the signals received by spectrum sensors of $j_{th}$ and $k_{th}$ subcarriers; $S_{j,l}^{cr}$ and $S_{k,l}^{pu}$ respectively represent the data of the primary user network system and of the cognitive radio network system on $j_{th}$ and $k_{th}$ subcarriers. Therefore, a cyclostationary feature $\Gamma_R^{k-j}$ can be generated via $(R_{k,l}\cdot R_{j,l}^*)$ due to the relevant $S_{k,l}^{cr}$ and $S_{j,l}^{pu}$.

Considering the pilot signal embedded into the signal of the cognitive radio network system, the pilot signal $S_{j,l}^{pu}$ of the known PUs is copied to the cognitive radio signal $S_{k,l}^{cr}$. Therefore, by the use of the cyclostationary examination, the intensity characteristics of the received signal can be obtained via the spectral correlation function of the active sensing node according the following performance formula:

$$\Gamma_R^{k-j}=\overline{R_j}\cdot\overline{R_k}^*$$

Finally, according to the active spectrum sensing in the presence of PUs, the energy detection method is executed to obtain the test statistic T(R). Its performance formula is as follows:

$$T(R)=|\Gamma_R^{k-j}|^2=|\overline{R_j}\cdot\overline{R_k}^*|^2$$

Figure 2:
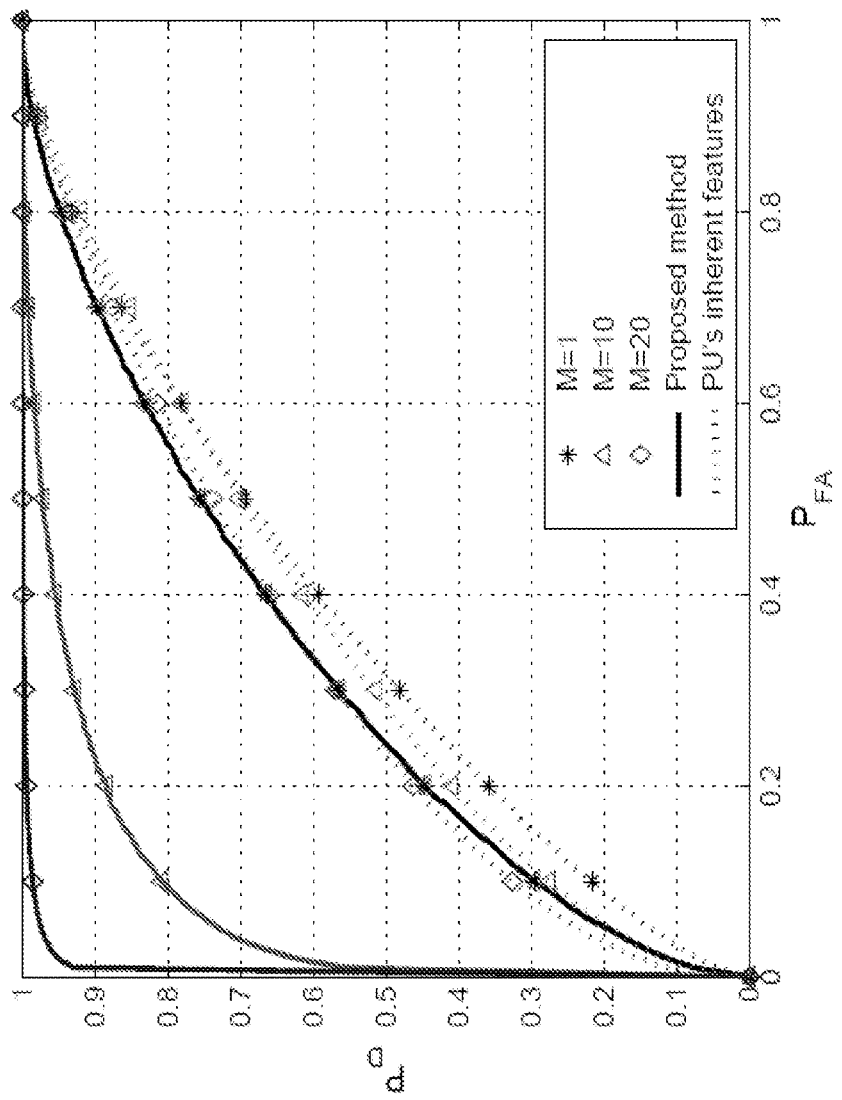
FIG. 2 is a schematic view of a receiver operating characteristic curve according to the invention.
Figure 3:
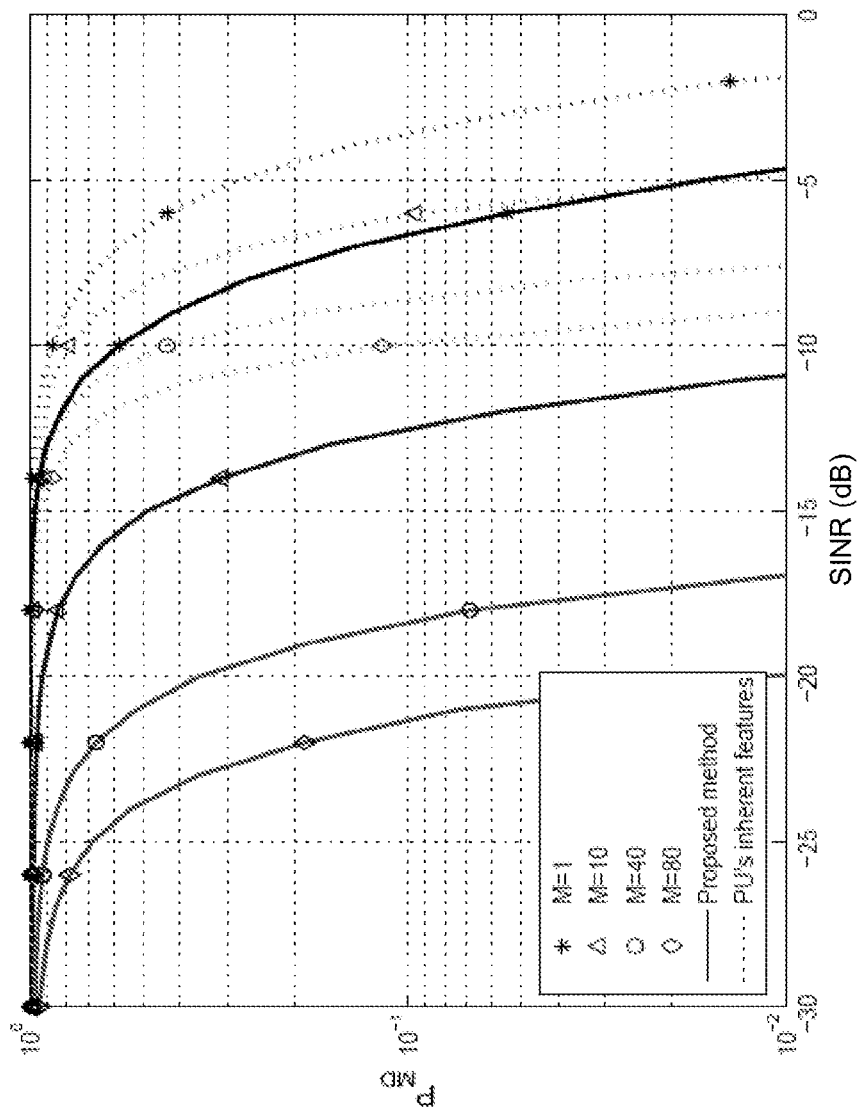
FIG. 3 is a schematic view of a performance curve according to the invention.

Please refer to FIG. 2 and FIG. 3, which are respectively a schematic view of a receiver operating characteristic curve according to the invention, and a schematic view of a performance curve according to the invention. As shown, when in a simulation test, the present invention uses a DVB-T 2K mode as the primary user network, and also as the cognitive radio system in the simulation like the OFDM system of the 2048 subcarrier used in DVB-T. The primary user network system and cognitive radio network system are operated in the same radio frequency band. In addition, the active sensing node in the simulation is a SCF-based cyclostationary feature detector to detect the intensity characteristics of the primary user signal. In simulation, K represents the total number of OFDM symbols of the pilot signal embedded into the cognitive radio signal, and M represents the average number of OFDM symbols in each test.

In the simulation for the relation between the detection probability and false alarm probability according to FIG. 2, the solid lines represent the active spectrum sensing curve by using the method of this method; the dotted lines represent the intensity characteristics of the primary user signal detected by using cyclostationary feature detector. When the SNR is set to 0 dB and SINR is set to −12 dB, the results show that the performance of active spectrum detection by using the method of the present invention is significant with good detection probability.

In the simulation according to FIG. 3, the curve as shown represents the detection performance of active spectrum sensing in AWGN channel. The false alarm probability is 0.01, SNR is 0 dB, and SINR is −10 dB. The results show that the method proposed in this invention can actively control the signal intensity with extremely low false alarm probability, effectively reducing the same-frequency interference.

The cognitive active spectrum sensing method based on the radio spectral correlation function according to the invention includes, according to the principle of cyclostationary signature design, duplicating the pilot signal data of the primary user signal to the cognitive radio network, and then obtaining the spectral correlation about intensity characteristics of the mixed-signal via the spectral correlation function of the active sensing node. Comparing the conventional active sensing method which attempts to detect the intensity characteristics of the primary user signal, this method can enhance the performance of the active sensing performance while remaining the service quality of the cognitive radio system, achieving better detection performance in the same detection time, reducing sensing time (about 1/10 of the traditional sensing time), and still reaching the satisfactory outcome even in the circumstances of low SNR and SINR. It is proved that this invention can detect any time while transmit data with high channel specification. Even in the suburbs the digital TV can be received as well. This renders the method of the invention be widely applied to the systems regarding to the cognitive radio system and the relevant users.

In summary, the active spectrum sensing method using the cognitive radio structure based on spectral correlation according to the invention can effectively improve the shortcomings of conventional technology, enhancing the active sensing performance while remaining the service quality of the cognitive radio system. Within the same period of detection time, this method can reach better detection performance, and reduce the sensing time. Furthermore, the satisfactory outcome can be still reached even in the circumstances of low SNR and SINR. It is proved that this invention can detect any time while transmit data with high channel specification. Even in the suburbs the digital TV can be received as well. This makes the invention more progressive and more practical in use which complies with the patent law.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An active spectrum sensing method using a cognitive radio signal structure based on spectral correlation, the method at least comprising the following steps:
   (A) copying pilot signals of primary users (PUs), and embedding the pilot signals to one or more subcarriers of cognitive radio (CR) systems, wherein when PU transmissions occupy the channel and the CR network is active, an active sensing node of the CR network will receive a mixed signal which contains the PU and CR's signal, wherein the mixed signal is correlated in the frequency-domain subcarriers and the correlation can be estimated:
   (B) obtaining a spectral correlation of intensity characteristics for the mixed signal from a spectral correlation function (SCF) of an active detection node of the cognitive radio network system when both of the PU network system and the CR network system are to transmit; and
   (C) detecting the spectral correlation of the intensity characteristics by an energy detection (ED) method.

2. The method of claim 1, wherein the PUs is a pilot embedded system, and is an orthogonal frequency division multiplexing (OFDM) based system.

3. The method of claim 1, wherein the active sensing node is a SCF-based cyclostationary feature detector to detect the intensity characteristics of the PUs from the mixed signal.

4. The method of claim 1, wherein at step (A), the pilot signal $S_{i,j}^{pu}$ of PU's $j_{th}$ subcarrier is duplicated, and the users of CR network embed the pilot signal into the $k_{th}$ subcarrier of its own signal, $S_{k,j}^{pu}=S_{j,l}^{pu}$, according to the performance formula as follows:

$$R_{j,l}=H_{j,l}^{pu} \cdot S_{j,l}^{pu}+H_{j,l}^{cr} \cdot S_{j,l}^{cr}+W_{j,l}$$

$$R_{k,l}=H_{k,l}^{pu} \cdot S_{k,l}^{pu}+H_{k,l}^{cr} \cdot S_{k,l}^{cr}+W_{k,l}$$

wherein $R_{j,l}$ and $R_{k,j}$ are the signals on $j_{th}$, and $k_{th}$ subcarriers received by the active sensor nodes, both signals contain the signals from the PUs and the CR.

5. The method of claim 1, at step (B) the mixed signal is subject to SCF test at the active sensing node to obtain a cyclostationary feature $\Gamma_R^{k-j}$.

6. The method of claim 1, wherein at step (C) the ED method is executed to obtain the test statistic T(R) according to the following performance formula:

$$T(R)=|\Gamma_R^{k-j}|^2=|\overline{R_j} \cdot \overline{R_k}^*|^2.$$

7. The method of claim 1, wherein at step (A) the pilot signals pass through the CR network system, and generated by data deployed on two or more of subcarrier signals.

\* \* \* \* \*